(12) United States Patent
Fujioka

(10) Patent No.: US 10,239,360 B2
(45) Date of Patent: Mar. 26, 2019

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 43 days.

(21) Appl. No.: 14/933,100

(22) Filed: Nov. 5, 2015

(65) Prior Publication Data

US 2016/0129733 A1 May 12, 2016

(30) Foreign Application Priority Data

Nov. 11, 2014 (JP) .................................. 2014-228990

(51) Int. Cl.
| | | |
|---|---|---|
| *B60C 11/11* | (2006.01) | |
| *B60C 13/02* | (2006.01) | |
| *B60C 11/01* | (2006.01) | |
| *B60C 13/00* | (2006.01) | |

(52) U.S. Cl.
CPC ............... *B60C 11/11* (2013.01); *B60C 11/01* (2013.01); *B60C 13/002* (2013.01); *B60C 13/02* (2013.01); *B60C 2200/14* (2013.01)

(58) Field of Classification Search
CPC ....... B60C 11/01; B60C 13/002; B60C 13/02; B60C 13/023; B60C 2013/026; B60C 27/006; B60C 27/0284; B60C 27/0292; B60C 27/065; B60C 27/066; B60C 27/00
USPC .................... 152/209.16, 523–525; D12/605
See application file for complete search history.

(56) References Cited

U.S. PATENT DOCUMENTS

| | | | | |
|---|---|---|---|---|
| 2,770,281 | A * | 11/1956 | Eddy ....................... | B60C 27/06 152/241 |
| D207,573 | S * | 5/1967 | Yukio ......................... | D12/605 |
| 5,571,351 | A * | 11/1996 | Hatakenaka ............ | B60C 11/01 152/209.16 |
| 6,250,353 | B1* | 6/2001 | Maxwell ............. | B60C 11/0316 152/209.15 |
| 2008/0073012 | A1* | 3/2008 | Miyazaki ............ | B60C 11/0311 152/209.19 |

(Continued)

FOREIGN PATENT DOCUMENTS

| | | | |
|---|---|---|---|
| JP | 2000-108614 A | 4/2000 | |
| JP | 2004291938 A * | 10/2004 | ............. B60C 13/02 |
| JP | 4367869 B2 | 11/2009 | |

(Continued)

OTHER PUBLICATIONS

Machine Translation: JP 2004291938 A; Obara, Masaaki; no date.*

(Continued)

*Primary Examiner* — Kendra Ly

(74) *Attorney, Agent, or Firm* — Westerman, Hattori, Daniels & Adrian, LLP

(57) ABSTRACT

The pneumatic tire includes a tread portion having lug grooves, and side portions which are contiguously formed with the tread portion. Projections which differ in at least one of a shape and a size are arranged on a side portion in a plurality of rows in a tire radial direction. Opening positions of small lug grooves on both sides of the tread portion are made to agree with a straight line which passes the projection and extends in the tire radial direction.

12 Claims, 3 Drawing Sheets

(56) References Cited

U.S. PATENT DOCUMENTS

| 2011/0126950 | A1* | 6/2011 | Barton | B60C 11/01 |
| | | | | 152/209.11 |
| 2013/0139936 | A1* | 6/2013 | Ohara | B60C 13/02 |
| | | | | 152/209.11 |

FOREIGN PATENT DOCUMENTS

| JP | 2010-188975 A | 9/2010 | | |
| JP | 2012-6449 A | 1/2012 | | |
| JP | 2012-20672 A | 2/2012 | | |
| JP | 2013-119277 A | 6/2013 | | |
| KR | 101416445 B1 * | 7/2014 | | B60C 27/04 |

OTHER PUBLICATIONS

Machine Translation: KR-101416445-B1; Hwang Seong Min; (Year: 2018).*

Office Action dated Dec. 28, 2016, issued in counterpart Chinese Patent Application No. 201510763050.X, with English translation. (15 pages).

Office Action dated Dec. 28, 2016, issued in counterpart Japanese Patent Application No. 201510763050.X, with English tranlsation. (15 pages).

Office Action dated Sep. 14, 2017, issued in Canadian Application No. 2910911 (4 pages).

* cited by examiner

PNEUMATIC TIRE

CROSS-REFERENCE TO RELATED APPLICATIONS

This application claims priority from Japanese Patent Application No. 2014-228990, the disclosure of which is incorporated herein by reference in their entireties.

BACKGROUND OF THE INVENTION

Field of the Invention
The present invention relates to a pneumatic tire.
Description of Related Art
Conventionally, as a pneumatic tire, there has been known a pneumatic tire where protect bars are formed on an outer surface of a side portion in a projecting manner along a circumferential direction of the tire, and inclined grooves which are inclined in directions opposite to each other with respect to a tire radial direction are alternately formed on the protect bars at intervals in the tire circumferential direction (see Japanese patent 4367869, for example).

Further, as another pneumatic tire, there has been known a pneumatic tire where a plurality of projections are formed on a buttress portion along a tire circumferential direction, and the projections are formed such that a projection size of the projections is decreased toward one side of the tire circumferential direction (see JP 2010-188975 A, for example).

However, in neither one of these pneumatic tires, the protection of the side portion when a tire chain is mounted on the pneumatic tire is taken into account. Further, when a vehicle travels on a bad road, mud or the like intrudes into grooves formed in the projection. When a state where mud intrudes into the groove or the like is kept, traction property of the tire is deteriorated. However, neither of these pneumatic tires taken into consideration a point of easily discharging intruded mud or the like (mud discharging property).

SUMMARY OF THE INVENTION

It is an object of the present invention to provide a pneumatic tire being excellent in property of protecting the tire from a mounted tire chain or being excellent in property of discharging mud from grooves formed on the tire.

To overcome the above-mentioned drawback, according to one aspect of the present invention, there is provided a pneumatic tire where projections which differ in at least one of a shape and a size are arranged on a side portion in a plurality of rows in a tire radial direction.

With such a configuration, when a tire chain is mounted on the tire, an one of the projections never fails to be brought into contact with the tire chain in the side portion. Accordingly, there is no possibility that the tire chain is brought into direct contact with the side portion and hence, a damage of the tire by the tire chain can be prevented. Further, the projections differ in shape or size and hence, the manner of deformation differs among the respective projections whereby mud or the like intruded into the inside of a groove formed between the projections can be effectively discharged.

The projections are arranged in two rows in the tire radial direction, and the projections are formed into a polygonal shape when the side portion is viewed in a plan view, and the number of segments which form the polygonal shape positioned on the same straight line extending in the tire radial direction differs between the first row on a tread portion side and the second row on a side opposite to the tread portion.

For example, the polygonal shape may be constituted of a triangular shape and a quadrangular shape.

The projections are arranged in two rows in the tire radial direction, and in a state where the side portion is viewed in a plan view, sizes of the projections positioned on the same straight line extending in the tire radial direction may differ from each other between the first row on a tread portion side and the second row on a side opposite to the tread portion.

It is preferable that the pneumatic tire include the tread portion having lug grooves and side portions formed continuously with the tread portion, and opening positions of the lug grooves on both sides of the tread portion agree with a straight line which passes the projections and extends in a tire radial direction.

With such a configuration, a tire chain mounted on the tire can be arranged such that the tire chain is surely brought into contact with the projections in the side portion. Accordingly, there is no possibility that the tire is damaged by the tire chain.

Small lugs positioned on an outer radial side in a tire radial direction of the projections may be formed in the side portion, and a small lug groove extending in a tire radial direction and capable of guiding a tire chain may be formed between the small lugs.

It is preferable that a groove portion formed between the projections arranged parallel to each other in the tire circumferential direction in the side portion be inclined with respect to a straight line extending in a tire radial direction.

With such a configuration, at the time of traveling on a road surface, mud or the like which intrudes into the groove portion can be smoothly discharged to the outside due to the rotation of the tire.

In this case, it is preferable that the groove portions are formed such that an inclination angle θ with respect to a straight line extending in the tire radial direction satisfy 5°≤θ≤60°.

It is preferable that the inclination angle θ of the groove portion differ between the groove portions continuously formed in respective rows in the tire radial direction.

With such a configuration, mud discharging property can be further improved.

According to the present invention, a plurality of projections are formed in the side portion and hence, when a tire chain is mounted on the tire, the tire chain is brought into contact with the projections whereby there is no possibility that the side portion is damaged. Further, the respective projections differ in shape or size and hence, the projections differ in the manner of deformation whereby mud or the like which intrudes into the inside of the groove formed between the projections can be effectively discharged.

DETAILED DESCRIPTION OF THE PREFERRED EMBODIMENT

Hereinafter, embodiments of the present invention are described by reference to attached drawings. The description made hereinafter merely shows an example essentially, and does not intend to limit the present invention, products to which the present invention is applied, or its applications. Further, drawings are schematically shown and hence, ratios of respective sizes and the like may differ from actual ratios of sizes and the like.

Figure 1:
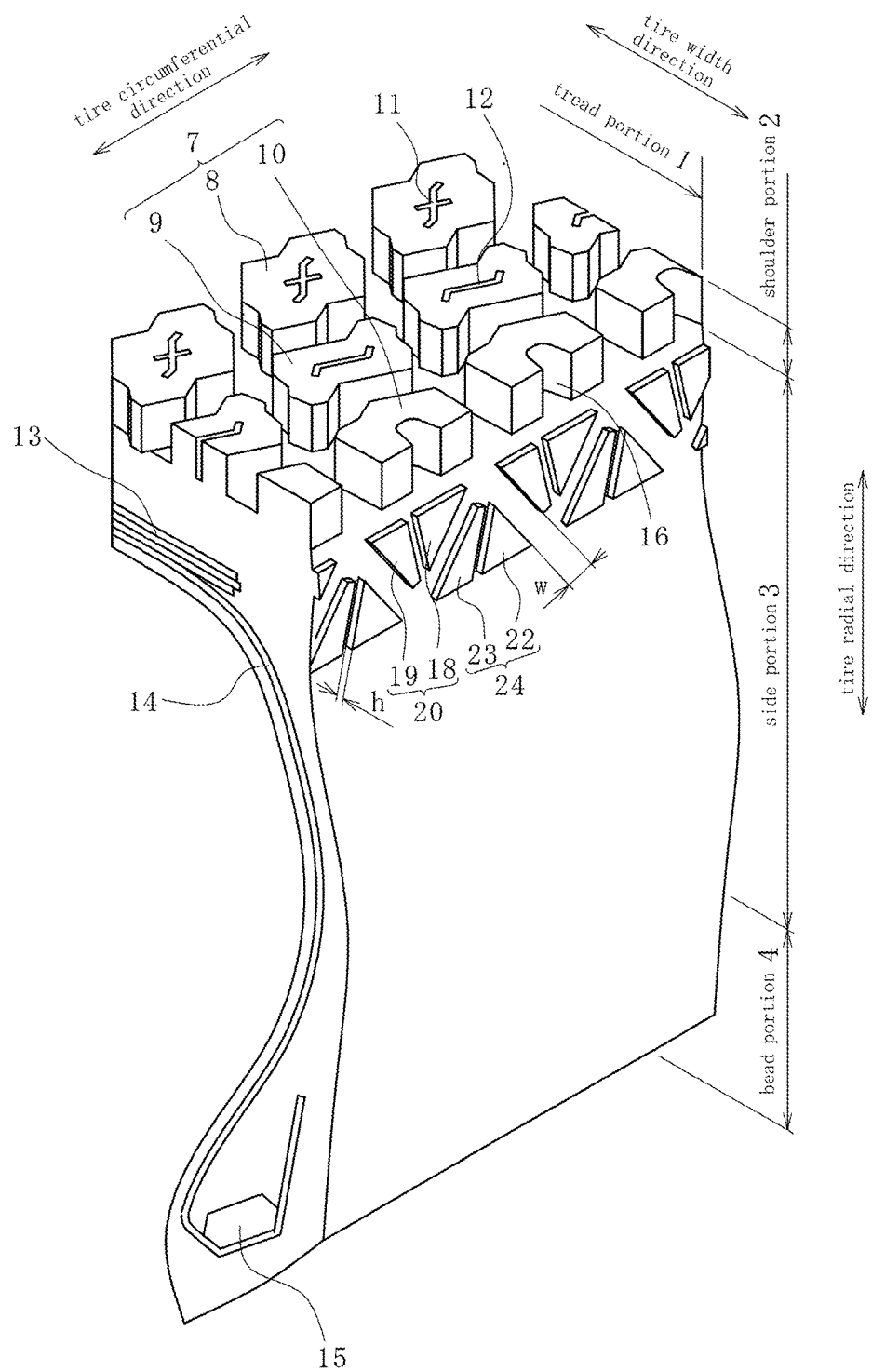
FIG. 1 is a perspective view with a part broken away showing a pneumatic tire according to this embodiment in an enlarged manner.

FIG. 1 is a cross-sectional perspective view showing a portion of a pneumatic tire according to this embodiment. The pneumatic tire has the outer structure constituted of a tread portion 1, shoulder portions 2, side portions 3 and bead portions 4. The tread portion 1 has a block pattern where a plurality of blocks 7 are formed by four main grooves 5 which extend in the tire circumferential direction in a zigzag manner and a plurality of lateral grooves 6 (lug grooves) which intersect with the main grooves 5 and extend in the tire width direction in a zigzag manner.

Figure 2:
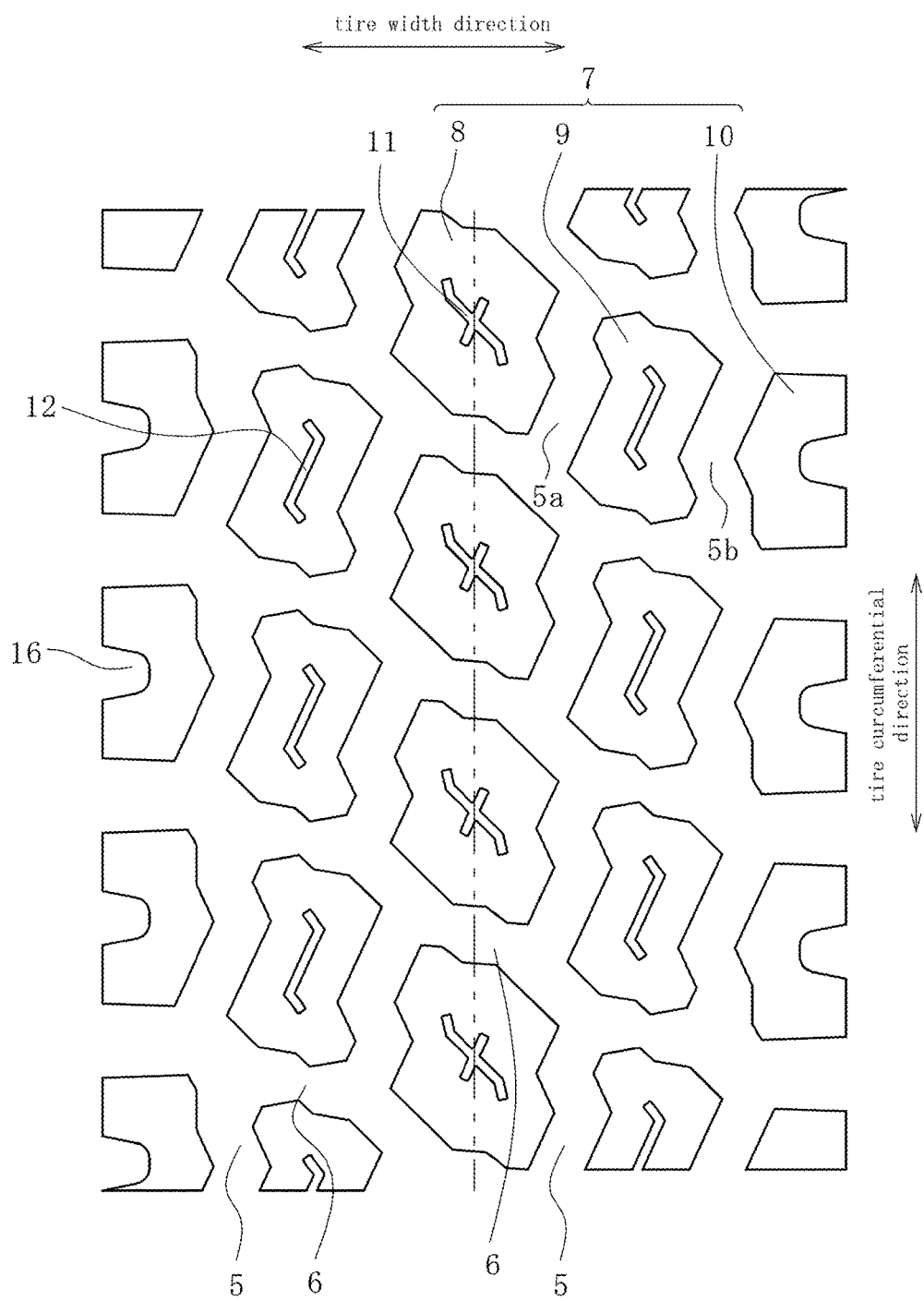
FIG. 2 is a developed view showing a portion of a tread portion of the tire shown in FIG. 1.

As shown in FIG. 2, the blocks 7 are constituted of first blocks 8 (first lateral grooves) positioned at the center in the tire width direction, second blocks 9 (second lateral grooves) positioned on both sides of the first blocks 8, and third blocks 10 (lugs) positioned further outside the second blocks 9.

The first block 8 has a shape formed by cutting off four corners of a parallelogram as viewed in a plan view. Corner portions (first corner portions) at diagonal positions where an internal angle is an obtuse angle are cut off such that a short-side side becomes parallel and a long-side side spreads on a short side than a parallel line. Corner portions (second corner portions) at diagonal positions where an internal angle is an acute angle are cut off in a bent shape such that a width size between the first block 8 and the neighboring first block 8 is enlarged or shrunken. A closure grooves (in-block) 11 is formed on a center portion of an upper surface of the first block 8. The closure grooves 11 are formed such that the closure grooves 11 intersect with each other, and the closure grooves 11 are laid out in a well-balanced manner relative to the whole shape of the block 7.

In the second block 9, a set of corner portions arranged at diagonal positions project sideward respectively. A closure groove (in-block) 12 is formed on a center portion of the second block 9 along the longitudinal direction. Both end portions of the closure groove 12 are bent in conformity with a projecting shape of the corner portion. The second blocks 9 are arranged on both sides of the first blocks 8 in a positionally displaced manner in the circumferential direction. This arrangement is adopted for making a projecting portion of the corner portion of the second block 9 correspond to a cut-off portion of the first corner portion of the first block 8. With such a configuration, a first main groove 5a which is bent and has a uniform width is formed between the first block 8 and the second block 9.

The third block 10 is bent in conformity with an edge shape of a portion of the second block 9 which faces the third block 10 in an opposed manner. In the same manner as the first main groove formed between the first block 8 and the second block 9, a second main groove 5b which is bent and has a uniform width is formed.

As shown in FIG. 1, a belt 13 which has a strip shape and is annularly connected in a tire circumferential direction is embedded in the tread portion 1 in plural layers in a tire radial direction. A carcass 14 is arranged on an inner tire radial side of the belt 13. The carcass 14 extends to the beads 15 and is folded back at the beads 15.

The shoulder portions 2 are formed outside the third blocks 10. A small lug groove 16 which extends in the tire radial direction is formed on a center portion of an outer surface of each third block 10. A connector portion 29 of a tire chain 28 is arranged in the small lug groove 16 as described later so as to prevent the positional displacement of the tire chain 28 in the tire circumferential direction.

Figure 3:
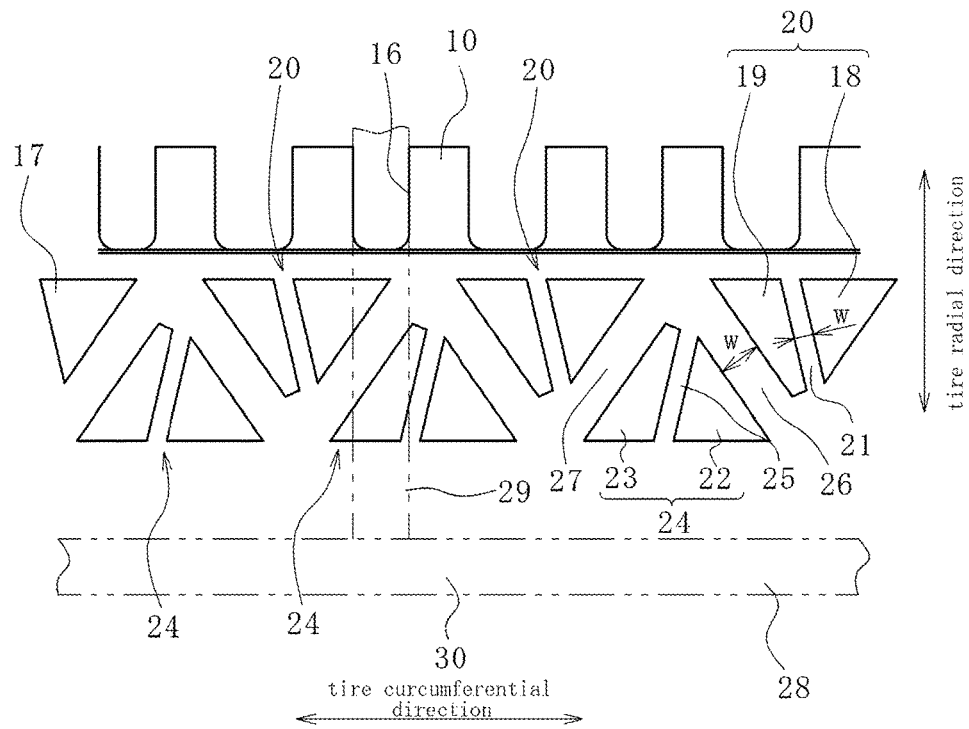
FIG. 3 is a side view showing a portion of a shoulder portion and a portion of a side portion of the tire shown in FIG. 1.

A plurality of projections 17 are formed on an outer surface of the side portion 3 parallel to each other in the tire circumferential direction along the shoulder portion 2. The projections 17 are formed in rows in the tire radial direction. In FIG. 3, a plurality of projections 17 are formed in two rows in the tire radial direction. That is, the projections 17 are formed in a first row which is a region arranged adjacent to the shoulder portion 2 on a tread portion 1 side and in a second row on a more inner diameter side than the first row in the tire radial direction. In this embodiment, projection sizes of the respective projections 17 from an outer surface of the side portion 3 are set equal. In FIG. 3, for the sake of convenience, the tire circumferential direction is indicated by a straight line extending laterally. However, an actual tire circumferential direction is an arcuate line.

In both first and second rows, the projection 17 having a triangular shape as viewed in a plan view and the projection 17 having a quadrangular shape as viewed in a plan view are alternately arranged in the tire circumferential direction. In the first row, a first projection pair 20 where an inverse triangular projection 18 and a first quadrangular projection 19 forms a set is arranged at fixed intervals in the tire circumferential direction. An upper side of the inverse triangular projection 18 and an upper side of the first quadrangular projection 19 are positioned on the same circumference in the tire circumferential direction. A first groove 21 is formed between the inverse triangular projection 18 and the first quadrangular projection 19. The first groove 21 is inclined with respect to a straight line which extends in the tire radial direction. In the second row, a second projection pair 24 where a triangular projection 22 and a second quadrangular projection 23 forms a set is arranged parallel to each other in the tire circumferential direction. A lower side of the triangular projection 22 and a lower side of the second quadrangular projection 23 are positioned on the same circumference in the tire circumferential direction. A second groove 25 is formed between the triangular projection 22 and the second quadrangular projection 23. The second groove 25 is inclined with respect to a straight line which extends in the tire radial direction. Although the first groove 21 and the second groove 25 have the same width size, these grooves have the opposite inclination directions with respect to the straight line which extends in the tire radial direction.

Between the first projection pairs 20 in the first row and the second projection pairs 24 in the second row, third grooves 26 and fourth grooves 27 are formed. The third groove 26 is formed between the first, quadrangular projection 19 of the first projection pair 20 and the triangular projection 22 of the second projection pair 24. The fourth groove 27 is formed between the inverse triangular projection 18 of the first projection pair 20 and the second quadrangular projection 23 of the second projection pair 24. The third groove 26 and the fourth groove 27 have the same width size, and the width size of the third groove 26 and the fourth groove 27 is set larger than the width size of the first groove 21 and the second groove 25. The third groove 26 and the fourth groove 27 have the opposite inclination directions with respect to the straight line which extends in the tire radial direction. Further, the inclination angles of the first groove 21 and the second groove 25 with respect to the straight line which extends in the tire radial direction differ from the inclination angles of the third groove 26 and the fourth groove 27 with respect to the straight line which extends in the tire radial direction.

Groove widths w of the first groove 21, the second groove 25, the third groove 26 and the fourth groove 27 are set to 3 mm≤w≤20 mm. By setting the widths w of the respective grooves within this range, mud or the like which intrudes into the groove minimally remains. Further, when the tire chain 28 is mounted on the tire, as described later, the projection 17 is brought into contact with the connector portion 29 of the tire chain 28 and hence, it is possible to properly prevent an outer surface of the side portion 3 from being damaged. When the groove width is smaller than 3 mm, the discharge of intruded mud or the like becomes difficult, while when the groove width is larger than 20 mm, the tire chain 28 is directly brought into contact with the outer surface of the side portion and hence, the tire is likely to be damaged.

A height h of the projection 17 is set to 1 mm≤h≤10 mm. By setting the height of the projection 17 within this range, the tire chain 28 is minimally brought into contact with the outer surface of the side portion 3 and hence, it is possible to prevent the outer surface of the side portion 3 from being damaged. When the height of the projection 17 is smaller than 1 mm, it is difficult to prevent the tire chain 28 from being brought into contact with the outer surface of the side portion 3, while when the height of the projection 17 is larger than 10 mm, the projection 17 is likely to be deformed so that cracks are likely to occur in a proximal portion of the projection 17.

Further, the inclination angles θ of the first groove 21, the second groove 25, the third groove 26 and the fourth groove 27 are set to 5°≤θ≤60° with respect to a straight line extending in the tire radial direction. By setting the inclination angles θ within this range, even when mud or the like intrudes into the grooves, when the tire is rotated, it is possible to smoothly discharge mud or the like to the outside. Further, the projections 17 on both sides which form the grooves differ in shape from each other and hence, the projections 17 are non-uniformly deformed. As a result, the projections 17 differ from each other in the manner of applying an action to mud or the like in the grooves and hence, mud or the like can be effectively discharged to the outside.

The projections 17 in the first row and the second row are arranged such that the inverse triangular projection 18 in the first row and the second quadrangular projection 23 in the second row are positioned with respect to the straight line extending the in the tire radial direction which passes the center of the small lug groove 16 formed in the third block 10.

The pneumatic tire having the tread pattern described above can be used in a mode where the tire chain 28 is mounted on the pneumatic tire. The tire chain 28 is formed of: a ladder-like or mesh-like cross tire chain portion (not shown in the drawing) arranged on the tread portion 1 of the tire; connector portions 29 arranged in the small lug grooves 16 and extending along the tire radial direction; and side tire chain portions 30 arranged on the side portions 3 on both sides of the tire and extending along the tire circumferential direction. By arranging the connector portions 29 of the tire chain 28 into the small lug grooves 16 formed in the third blocks 10, it is possible to prevent the positional displacement of the tire chain 28 in the tire circumferential direction.

The connector portions 29 of the tire chain 28 are brought into contact with the projections 17 formed in two rows respectively on the side portions 3 of the tire. To be more specific, the connector portions 29 of the tire chain 28 are brought into contact with the inverse triangular projections 18 in the first row and the second quadrangular projections 23 in the second row, and are not directly brought into contact with the outer surfaces of the side portions 3. Accordingly, it is possible to surely prevent the tire chain 28 from damaging the side portions 3 of the tire.

When the pneumatic tire on which the tire chain 28 is mounted travels on a bad road, there may be a case where mud or the like intrudes into the first to fourth grooves. In this case, the proper groove widths are secured and, further, the grooves are formed with inclinations with respect to the straight line extending in the tire radial direction. Further, the projections 17 arranged adjacent to each other with a groove interposed therebetween differ from each other in shape. Accordingly, mud or the like which intrudes into the grooves can be surely discharged to the outside without causing the stagnation of the mud or the like.

Although the case where the tire chain 28 is mounted on the tire has been explained heretofore, provided that the tire includes the projections 17, the tire exhibits excellent mud discharging property at the time of traveling on a bad road and can acquire desired traction performance even when the tire chain 28 is not mounted on the tire.

The present invention is not limited to the configuration described in the embodiment, and various modifications are conceivable.

For example, in the above-mentioned embodiment, the projections 17 are formed of two kinds of projections having a triangular shape and a quadrangular shape as viewed in a plan view. However, the present invention is not limited to this combination, and various combinations such as the combination of a triangular shape and a pentagonal shape can be adopted. Further, not only the combination of two kinds of projections but also the combination of three or more kinds of projections may be also adopted.

Further, although the shapes of the projections 17 are made different from each other in the above-mentioned embodiment, simply the sizes (areas) of the projections as viewed in a plan view may be made different from each other.

Figure 4:
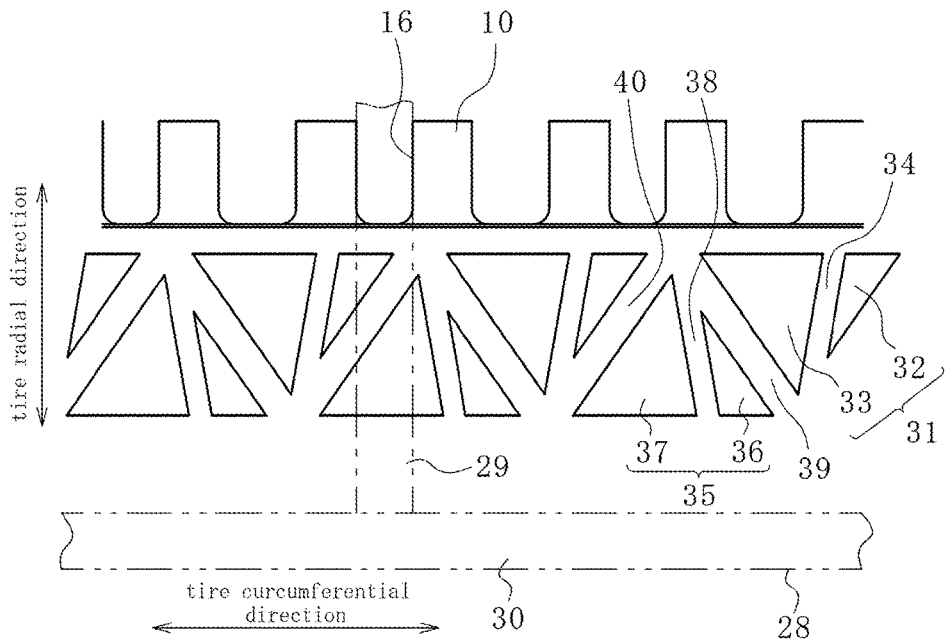
FIG. 4 is a side view showing a portion of a shoulder portion and a portion of a side portion of a tire according to another embodiment.

FIG. 4 shows an example where the shapes of the projections 17 as viewed in a plan view are set to a triangular shape, and the areas of the projections 17 are made different from each other. That is, a first projection pair 31 in a first row is a combination of a small inverse triangular projection 32 having a small area which is obtained by viewing an outer surface of the side portion 3 in a plan view, and a large inverse triangular projection 33 having a large area which is obtained by viewing the outer surface of the side portion 3 in a plan view. A first groove 34 is formed between the small inverse triangular projection 32 and the large inverse triangular projection 33. An upper side of the small inverse triangular projection 32 and an upper side of the large inverse triangular projection 33 are positioned on the same circumference in the tire circumferential direction. A second projection pair 35 in a second row is a combination of a small triangular projection 36 and a large triangular projection 37. A second groove 38 is formed between the small triangular projection 36 and the large triangular projection 37. A third groove 39 is formed between the large inverse triangular projection 33 and the small triangular projection 36. A fourth groove 40 is formed between the small inverse triangular projection 32 and the large triangular projection 37.

In this manner, even when all projections 17 are formed into a triangular shape, by making the sizes (areas) of the projections 17 different from each other, the respective projections 17 can be deformed non-uniformly and hence, the mud discharging performance can be improved. Further, when the tire chain 28 is mounted on the tire, the connector portions 29 are brought into contact with the respective projections 17 and hence, it is possible to prevent the tire chain 28 from being brought into contact with the outer surface of the side portion 3 whereby it is possible to prevent the tire from being damaged by the tire chain 28.

In the above-mentioned embodiment, only the shapes of the projections 17 are changed or only the sizes of the projections 17 are changed while allowing the projections 17 to have the same shape. However, both the shapes and the sizes of the projections 17 as viewed in a plan view may be changed together.

In the above-mentioned embodiment, the explanation has been made with respect to the tire provide with third blocks having the small lug grooves 16 on the tread portion 1. However, the tire having no such third blocks 10 can also acquire the substantially same advantageous effects by the projections 17. In this case, it is sufficient that the tire chain 28 is used in such a manner that the connector portion 29 is positioned in lateral grooves 6 (lug grooves) instead of the small lug grooves 16.

INDUSTRIAL APPLICABILITY

The present invention is applicable to pneumatic tires in general, and more particularly a large-sized tire for a truck, a bus or the like suitable for use as a pneumatic tire where the tire is used with a chain mounted thereon.

What is claimed is:

1. A pneumatic tire, comprising:
   a tread portion that forms a ground contacting surface and that extends around an outer circumference of the tire and across a width of the tire, said tread portion having lug grooves;
   side portions extending radially inwards in a tire radial direction from opposite sides of the width of the tread portion;
   wherein a plurality of projections which differ in at least one of a shape and a size are arranged on the side portions in a plurality of rows which are displaced from each other in said tire radial direction, and
   wherein small lugs are positioned at outer diameter sides of the projections with small lug grooves extending in the tire radial direction to guide a tire chain by the small lugs,
   wherein a second row of the plurality of rows which is displaced in the tire radial direction further from the tread portion than a first row of the plurality of rows includes projections that are positioned radially aligned in the tire radial direction with the small lug grooves, and wherein respective ones of said projections in said second row are each sized so as to span entirely across a respective one of said small lug grooves in the tire circumferential direction such that a tire chain supported anywhere within the small lug groove and extending along a side portion radially inwardly in the tire radial direction will necessarily contact a respective one of said projections such as to be displaced from the side portion of said pneumatic tire,
   wherein the projections are formed into polygonal shapes when the side portion is viewed in a plan view, and
   wherein a number of segments which form the polygonal shapes that are positioned radially aligned in the tire radial direction differs between the first row and the second row.

2. The pneumatic tire according to claim 1, wherein the polygonal shapes comprise a triangular shape and a quadrangular shape.

3. The pneumatic tire according to claim 1, wherein the projections are arranged in two rows in the tire radial direction, and in a state where the side portion is viewed in a plan view, sizes of the projections positioned radially aligned in the tire radial direction differ from each other between the first row and the second row.

4. The pneumatic tire according to claim 1, wherein: the lug grooves are formed in between adjacent ones of said small lugs.

5. The pneumatic tire according to claim 1, wherein a groove portion formed between the projections arranged parallel to each other in a tire circumferential direction in the side portion is inclined with respect to a straight line extending in the tire radial direction.

6. The pneumatic tire according to claim 5, wherein the groove portion is formed such that an inclination angle $\theta$ with respect to a straight line extending in the tire radial direction satisfies $5° \leq \theta \leq 60°$.

7. The pneumatic tire according to claim 5, the groove portion is formed such that an inclination angle $\theta$ with respect to a straight line extending in the tire radial direction differs between groove portions continuously formed in respective rows in the tire radial direction.

8. The pneumatic tire according to claim 1, wherein said small lug grooves are formed in outer surfaces of shoulder portions of said small lugs.

9. The pneumatic tire according to claim 8,
   wherein the pneumatic tire includes a tire chain arranged on the tread portion, which includes a plurality of connector portions extending in the radial direction, with respective ones of said plurality of connector portions being arranged in respective ones of said small lug grooves.

10. The pneumatic tire according to claim 9, wherein the plurality of connector portions are brought into contact with said projections such as to be displaced from the side portions of said pneumatic tire.

11. The pneumatic tire according to claim 1,
    wherein the pneumatic tire includes a tire chain arranged on the tread portion, which includes a plurality of connector portions extending in the radial direction, with respective ones of said plurality of connector portions being arranged in respective ones of said small lug grooves.

12. The pneumatic tire according to claim 11, wherein the plurality of connector portions are brought into contact with said projections such as to be displaced from the side portions of said pneumatic tire.

* * * * *